United States Patent
Joppi et al.

(10) Patent No.: US 10,535,094 B2
(45) Date of Patent: Jan. 14, 2020

(54) SHELF LIGHTING SYSTEM AND METHOD FOR LOCATING PRODUCTS AND MANAGING PRICING INFORMATION

(71) Applicant: ZUMTOBEL LIGHTING GMBH, Dornbirn (AT)

(72) Inventors: Rene Joppi, Dornbirn (AT); Gregor Mayr, Dornbirn (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 460 days.

(21) Appl. No.: 15/501,462

(22) PCT Filed: Aug. 7, 2015

(86) PCT No.: PCT/EP2015/068260
§ 371 (c)(1),
(2) Date: Feb. 3, 2017

(87) PCT Pub. No.: WO2016/020527
PCT Pub. Date: Feb. 11, 2016

(65) Prior Publication Data
US 2017/0228816 A1    Aug. 10, 2017

(30) Foreign Application Priority Data
Aug. 7, 2014    (DE) .......................... 10 2014 215 629

(51) Int. Cl.
*H05B 33/00*    (2006.01)
*G06Q 30/06*    (2012.01)
(Continued)

(52) U.S. Cl.
CPC ....... *G06Q 30/0639* (2013.01); *A47F 5/0043* (2013.01); *A47F 11/10* (2013.01);
(Continued)

(58) Field of Classification Search
CPC ....... H04W 4/80; H04W 12/06; H04W 4/029; H04W 4/02; H04W 4/70; H04W 12/04;
(Continued)

(56) References Cited

U.S. PATENT DOCUMENTS 8,604,908 B1    12/2013    Kuniavsky et al.
2004/0088229 A1    5/2004    Xu
(Continued)

FOREIGN PATENT DOCUMENTS

CA    2207631    4/1997
DE    19538115    4/1997
(Continued)

OTHER PUBLICATIONS

German search report in priority German patent application 10 2014 215 629.7 dated Mar. 27, 2015.
(Continued)

*Primary Examiner* — Monica C King
(74) *Attorney, Agent, or Firm* — Andrus Intellectual Property Law (57) ABSTRACT

A lighting system (10), in particular a shelf lighting system, is used for locating products (40, 41, 42). Said lighting system comprises at least two lamp units (24-31), each of which (24-31) or a defined group of which (24-31) is assigned to a different space, especially a shelf surface. The lighting system (10) further comprises a control unit for controlling the lamp units (24-31), to each of which (24-31) or to each defined group of which (24-31) a different lamp address is assigned. The lamp address is linked to a product association that is unambiguously associated with a product (40, 41, 42) located in the assigned space. The lighting system (10) also comprises a user interface (54) used for displaying the product associate and for selecting, by means of the displayed product association, the lamp unit (24-31)

(Continued)

or defined group of lamp units (24-31) to be controlled. The invention further relates to a corresponding method for providing a lighting system (10) and locating a product.

28 Claims, 3 Drawing Sheets

(51) Int. Cl.
| | |
|---|---|
| *A47F 11/10* | (2006.01) |
| *G06Q 10/08* | (2012.01) |
| *H05B 37/02* | (2006.01) |
| *B65G 1/137* | (2006.01) |
| *A47F 5/00* | (2006.01) |
| *G06F 3/147* | (2006.01) |
| *H05B 33/08* | (2006.01) |
| *G06F 3/0482* | (2013.01) |

(52) U.S. Cl.
CPC .............. *B65G 1/137* (2013.01); *G06F 3/147* (2013.01); *G06Q 10/087* (2013.01); *H05B 33/0842* (2013.01); *H05B 37/029* (2013.01); *H05B 37/0272* (2013.01); *G06F 3/0482* (2013.01)

(58) Field of Classification Search
CPC ....... H04W 4/021; H04W 4/023; H04W 4/40; H04W 84/18; H04W 12/02; H04W 4/025; H04W 4/46; H04W 4/50; H04W 64/006; H04W 28/0252; H04W 36/08; H04W 36/30; H04W 48/16; H04W 4/027; H04W 4/20; H04W 4/21; H04W 4/30; H04W 4/33; H04W 4/38; H04W 4/44; H04W 4/60; H04W 52/322; H04W 76/11; H04W 76/15; H04W 84/20; H04W 12/003; H04W 12/00503; H04W 12/08; H04W 12/12; H04W 24/10; H04W 40/02; H04W 4/024; H04W 4/043; H04W 4/06; H04W 4/16; H04W 52/0212; H04W 52/04; H04W 64/00; H04W 64/003; H04W 76/10; H04W 76/14; H04W 84/10; H04W 84/12; H04W 88/02; H04W 88/06; H04W 8/18; H04W 8/24; H04L 67/12; H04L 67/10; H04L 63/0428; H04L 67/125; H04L 63/06; H04L 63/08; H04L 67/42; H04L 9/321; H04L 9/3226; H04L 2209/80; H04L 2209/805; H04L 2209/84; H04L 43/0817; H04L 61/2007; H04L 61/609; H04L 63/1441; H04L 67/025; H04L 67/04; H04L 67/141; H04L 67/20; H04L 67/303; H04L 12/2803; H04L 12/2816; H04L 12/282; H04L 2012/285; H04L 41/0645; H04L 41/12; H04L 43/16; H04L 63/0227; H04L 63/0236; H04L 63/0846; H04L 63/0876; H04L 63/105; H04L 63/205; H04L 67/143; H04L 67/22; H04L 67/2842; H04L 67/34; H04L 12/2809; H04L 12/2818; H04L 12/2823; H04L 12/2825; H04L 12/2832; H04L 12/2838; H04L 1/0045; H04L 1/0061; H04L 1/0071; H04L 2012/2841; H04L 2209/38; H04L 2209/56; H04L 27/2602; H04L 29/08162; H04L 41/026; H04L 41/0813; H04L 41/0823; H04L 41/0833; H04L 43/08; H04L 43/10; H04L 45/14; H04L 45/22; H04L 45/745; H04L 47/19; H04L 47/24; H04L 63/0263; H04L 63/0272; H04L 63/0823; H04L 63/083; H04L 63/0838; H04L 63/0853; H04L 63/0869; H04L 63/1408; H04L 63/1425; H04L 63/168; H04L 65/403; H04L 67/02; H04L 67/06; H04L 67/1006; H04L 67/1097; H04L 67/18; H04L 67/2823; H04L 67/2833; H04L 67/306; H04L 69/08; H04L 69/22; H04L 7/0033; H04L 7/0075; H04L 7/0091; H04L 9/0838; H04L 9/0861; H04L 9/16; H04L 9/32; H04L 9/3236; H04L 9/3247; H04L 9/3268; H05B 37/0272; H05B 37/0218; H05B 37/0227; H05B 33/0842; H05B 33/0857; H05B 37/029

See application file for complete search history.

(56) References Cited

U.S. PATENT DOCUMENTS

| | | | |
|---|---|---|---|
| 2006/0008277 | A1 | 1/2006 | Noda |
| 2010/0049635 | A1* | 2/2010 | Delaney ............... G06Q 10/087 705/28 |
| 2012/0000974 | A1 | 1/2012 | Hung et al. |

FOREIGN PATENT DOCUMENTS

| | | |
|---|---|---|
| DE | 19756705 | 6/1999 |
| DE | 102007006562 | 8/2008 |
| DE | 102010018672 | 11/2011 |
| DE | 102013104365 | 10/2013 |
| JP | H03249003 | 11/1991 |
| WO | 2006126114 | 11/2006 |
| WO | 2012123352 | 9/2012 |

OTHER PUBLICATIONS

Austria search report for co-pending Austria application GM 367/2014 dated Mar. 11, 2015.
PCT search report in parent PCT application PCT/EP2015/068260 dated Dec. 23, 2015.

\* cited by examiner

SHELF LIGHTING SYSTEM AND METHOD FOR LOCATING PRODUCTS AND MANAGING PRICING INFORMATION

CROSS REFERENCE TO RELATED APPLICATION

The present application is the U.S. national stage application of International Application PCT/EP2015/068260, filed Aug. 7, 2015, which international application was published on Feb. 11, 2016 as International Publication WO 2016/020527 A1. The International Application claims priority to German Patent Application 10 2014 215 629.7, filed Aug. 7, 2014.

FIELD OF THE INVENTION

The invention relates to a lighting system, a method for providing a lighting system and a method for locating a product.

BACKGROUND OF THE INVENTION

The locating of products in larger retail spaces such as in shelf spaces of supermarkets, for example, is often very confusing due to a high diversity of goods so that the customer, even if already in the right aisle or in front of the right shelf can have difficulties locating the product. This causes a negative shopping experience and furthermore consumes the working hours of the staff, which is used for questions from the customers about product locations.

The international patent application WO 2006/126114 A1 shows a conventional shelf lighting system, which is suited to clearly illuminate the products made available on the shelves, however, doesn't make it easier to find the products.

The objective of the present invention is to create a lighting system and a method for providing a lighting system that simplifies the locating of desired products.

This objective is solved per the invention by the features described below.

SUMMARY OF THE INVENTION

A lighting system per the invention, particularly a shelf lighting system facilitates the locating of products. It comprises at least two lamp units, whereby at least one lamp unit or a defined group of lamp units is usually assigned to a different space, particularly a shelf space. The lighting system further comprises a control unit for controlling the lamp units to each of which, or to each defined group of which, a different lamp address is assigned. The lamp address is linked to a product association that is unambiguously associated with the product located in the assigned space. The lighting system also comprises a user interface used for displaying the product association and for selecting, by means of the displayed product association, the lamp unit or defined group of lamp units to be controlled. It is thus possible through the user interface to illuminate the lamp unit arranged near the product and to thus locate the product with very little effort.

Preferably, the user interface thus comprises a stationary operating unit and/or a mobile operating unit such as a mobile phone or a tablet, for example. The stationary and/or the mobile operating unit thereby displays the product association and provides for the selection of the lamp unit or defined group of lighting units through the assigned product association. Using a stationary operating unit, customers of the store can use the system without further requirements. Using a mobile operating unit may create increased effort, but this is not critical as most of the visitors of a store have a mobile phone anyway. The mobile operating unit furthermore enables a simultaneous operating by several users and an operation from different locations.

The control unit is preferably designed, during the selection of the product through the user interface, to control the lamp unit or defined group of lamp units assigned in accordance with the product association and lamp address such that illumination occurs in a predetermined color and/or intensity and/or a blinking pattern and/or with a change in intensity and/or with a color change. Very simple locating of the product is thereby ensured.

In a preferred further configuration, the user interface is designed to process simultaneously or subsequently a selection of a first product by a first user and a selection of a second product by a second user, and so forth. Any number of users may therefore select any number of products.

The control unit is preferably configured to control the lamp unit or defined group of lamp units assigned to the first product in accordance with the product assignment and the lamp address, to illuminate with a first intensity and/or a first blinking pattern and/or in a first color and/or with a first change in intensity and/or with a first color change for a first predetermined time, and to control the lamp unit or defined group of lamp units assigned to the second product in accordance with the product assignment and light address to illuminate with a second intensity and/or a second blinking pattern and/or in a second color and/or with a second change in intensity and/or with a second color change for a second predetermined time. The colors, intensities, blinking patterns, change in intensity, color change, etc. are thereby different. It is thus possible with the lighting system to show a desired product to more than one user at the same time; the first, second, etc. predetermined timeframe can overlap. More than two different products can naturally be displayed simultaneously by means of different colors, blinking patterns, etc. It is also feasible that during the output of an identical light signal, for example, the predetermined periods take place consecutively. It is also feasible that the optical signals are accompanied by acoustic signals.

The control unit is preferably formed to send out information through modulated light signals from the at least one lamp unit or defined group of lamp units. Information can thus be transmitted without further elaborate tools such as transmitters.

The lighting system may also comprise at least one electronic label that is affixed in a line of sight of at least one lamp unit or defined group of lamp units. The electronic label is thereby configured to receive modulated light signals from the lamp unit (assigned to it) or a defined group of lamp units. The electronic label is configured to retrieve the information of the at least one lamp unit or defined group of lamp units by means of the modulated light signals. In this case, the electronic label is configured to display the information. An interaction with the electronic label is thus possible without requiring cabling to the electronic label. For example, pricing information or information about ingredients or expiration dates can thus be transmitted to the electronic label and be displayed by it.

Preferably, the electronic label is furthermore equipped with a solar cell designed to receive light radiated from the at least one lamp unit or defined group of lamp units and to convert it into electrical current. The label thereby preferably doesn't have another external energy source. It is therefore possible to also achieve the energy supply of the electronic label by means of the other lighting system without wiring the electronic label.

In case the user interface comprises a mobile operating unit, it is preferably designed to receive the modulated light signals and to retrieve the contained information. The information can thus be output directly on a portable device.

The mobile operating unit is preferably designed to determine from the information whether the mobile operating unit has reached the location of a selected product association. The mobile operating unit is then designed to indicate that the mobile operating unit has reached the selected product and/or to transmit to the control unit that the mobile operating unit has reached the selected product. The control unit is thereby designed to terminate the control of the respective lamp unit or defined group of lamp units t when the mobile operating unit signals has reached the selected product. As soon as a user has been successfully led to his selected product, the display function of the lighting system can thus be used by another user without any time delay.

The mobile operating unit is preferably designed to determine a direction and/or position of the selected product from the received information, and to display a navigation route to the selected product. Finding the product can thus be further facilitated.

Preferably, the lighting system has at least one sensor designed to determine whether a user has reached a space of a product of a selected product association and to report that to the control unit. The control unit is then formed to terminate a control of the lamp unit or defined group of lamp units to be controlled, when the sensor signals that the user has reached the space. The duration of the specific lighting of a product can thus be further reduced for an inquiring user. This increases the availability of the system.

The control unit is preferably designed to perform the product association based on a manual user entry through the user interface and/or based on reading the barcode affixed on the product and/or a barcode affixed on the lighting system and/or based on reading an RFID transponder affixed on the product and/or an RFID transponder affixed on the lighting system. The product assignment can thus be established very flexibly and easily.

A method per the invention provides a lighting system, particularly a shelf lighting system for locating products comprising the following steps:

providing at least two lamp units, each of which or a defined group of which, is assigned to a different space, especially a shelf surface, assigning a lamp address to a lamp unit or defined group of lamp units in a control unit for controlling the lamp units, linking the lamp address with a product association that is unambiguously associated with the product located in the assigned space, and displaying the product association through a user interface.

It is thus possible to access the products available on the respective shelf through the user interface.

The method preferably facilitates the finding of a product and comprises the selection of a lamp unit or defined group of lamp units through the displayed product association and the control of the selected lamp unit or defined group of lamp units by means of the control unit. A requested product can thus simply be accessed through the user interface, which is then emphasized through illuminating the respective area of the shelf.

BRIEF DESCRIPTION OF THE DRAWINGS

In the following, the invention is described as an example using the drawings representing an advantageous embodiment of the invention. The drawings show.

DETAILED DESCRIPTION

Figure 1:
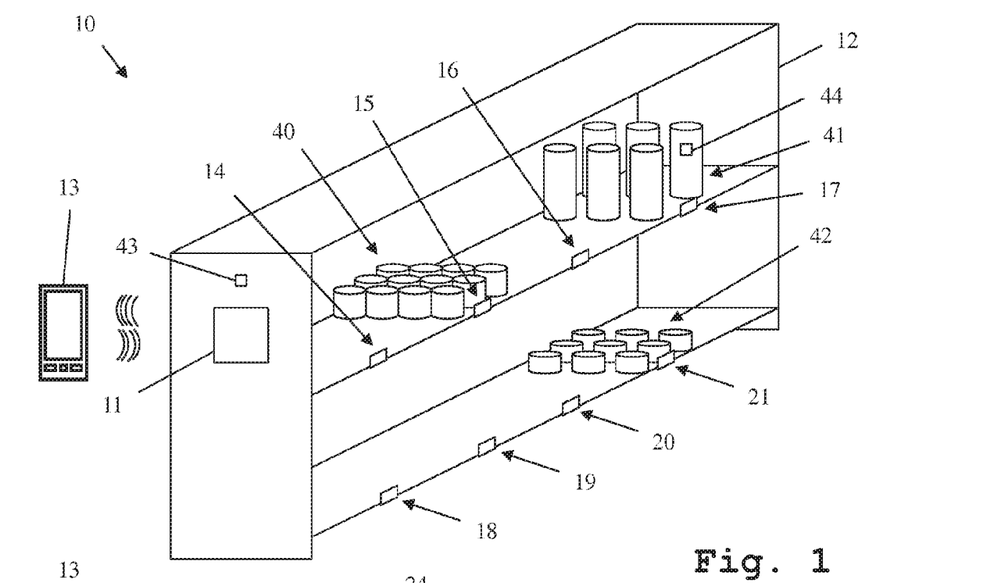
FIG. 1 shows a first example of the lighting system per the invention in two different views.
Figure 2:
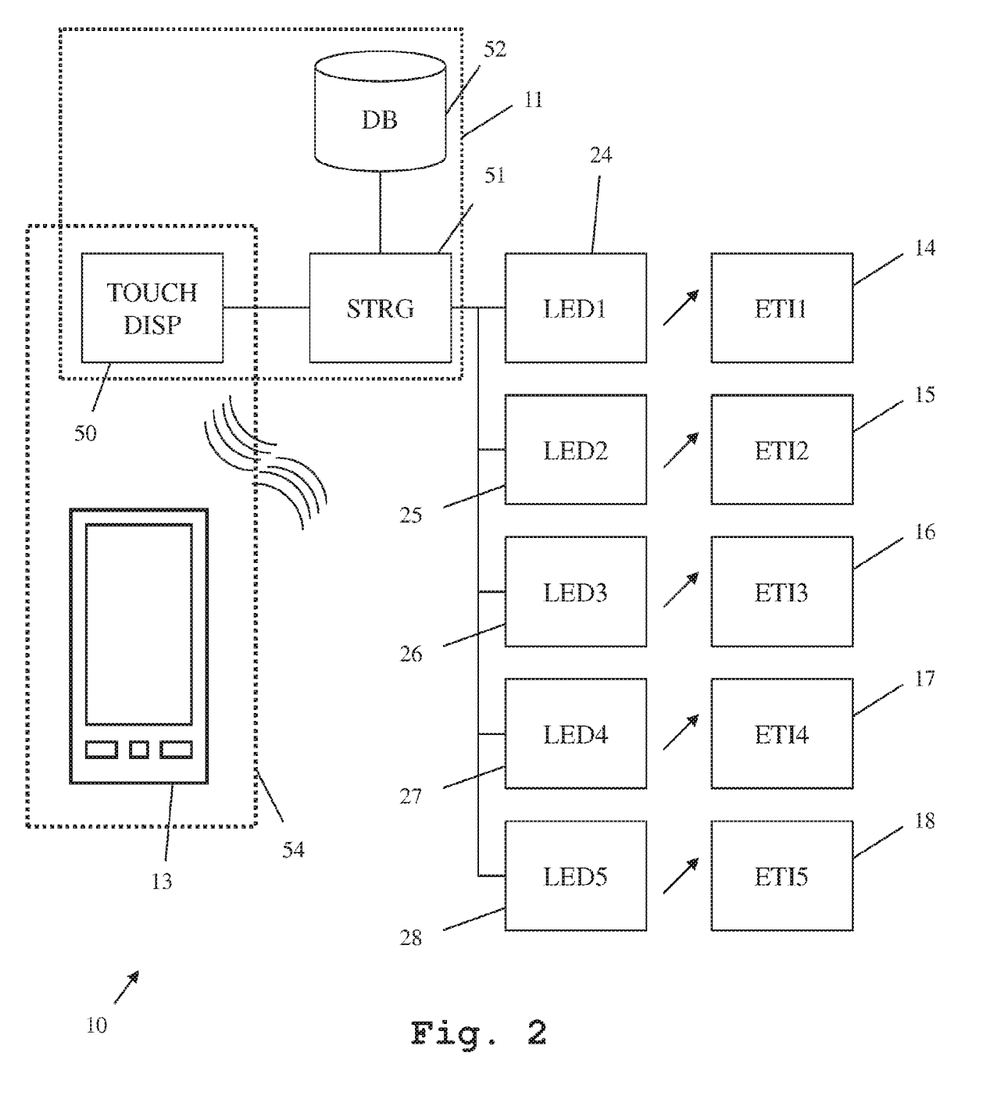
FIG. 2 shows a second example of the lighting system per the invention in a block diagram.

The structure and the general function of different examples of a lighting system per the invention are first explained with respect to FIGS. 1-2. The function of an execution example of the method per the invention is then described by means of FIG. 3. Identical elements were partially not represented and described repeatedly in similar figures.

An example of the lighting system 10 per the invention is shown in FIG. 1. The lighting system 10 comprises a control unit 11 that is installed on the front side of a shelf 12. The shelf 12 preferably comprises electronic labels 14, 15, 16, 17, 18, 19, 20, and 21, which are each affixed in specific areas of the shelf 12. The shelf 12 furthermore comprises lamp units 24, 25, 26, 27, 28, 29, 30, and 31, which are also assigned to one of these specific areas each and which light up the specific area. Each individual lamp unit 24-31 or defined groups of lamp units 24-31 has a lamp address assigned to it. Each lamp address is assigned to a product with a link to a product association. A DMX address can thus be used to address the lamps. This has the advantage that merely one first or starting address must be issued and that the remaining addresses arise automatically.

It is thereby not necessary to assign a single lamp unit to each individual product. Larger areas may be lit with a joint lamp unit. Also the display of the approximate location, in which the requested product is located, already represents substantial assistance to the customer.

In FIG. 1 above, products 40, 41, 42 are shown in individual areas. One of the products 41 is equipped with a barcode 44. A barcode 43 is furthermore affixed on the shelf 12 next to the control unit 11. The lighting system 10 shown further comprises a mobile phone 13 which communicates wirelessly with the control unit 11. Both the mobile phone 13 and control unit 11 can be designed as a user interface as part of the invention.

A user, who would like to locate a product on the shelf 12, interacts with the control unit 11. He or she can have available products 40-42 on the respective shelf 12 shown to him on a screen of the control unit 11. By selecting the product using the control unit 11, the lamp unit or group of lamp units to be controlled is thus determined and controlled by means of the product association. The control thereby takes place with the previously determined lamp address. By selecting one of the products 40-42 through the previously determined product assignment shown on the control unit 11, the user triggers a defined lighting up of a lamp unit 24-31 in an area that is assigned to the respective product 40-42. The lighting can take place in a color or light intensity that is preset or adjustable by the user. The illumination can be constant for a predetermined timeframe but a blinking pattern is also possible. The color, intensity, lighting duration, and blinking pattern can t be preset or can be adjusted by the user.

Alternatively, instead of a single lamp unit, a multitude of lamp units and thus a multitude of lamp addresses can be assigned to one product. This is particularly relevant if a large quantity of an identical product occupies a large section of a shelf 12. In this case, a defined group of lamp units can be controlled as a reaction to the selection of a product. The respective product association is accordingly linked with the respective number of lamp addresses in the control unit.

The control unit 11 comprises a stationary control unit for direct operation of the lighting system 10 through the control unit 11. This is further explained with respect to FIG. 2.

Alternatively or in addition to direct operation through the control unit 11, operation is possible through a mobile control unit 13, such as a mobile phone or a tablet, for example. In this case, the products are displayed on a screen of the mobile control unit 13 and can be chosen. Once a product is selected, it is communicated to the operating unit or control unit 11, which controls the lighting in the sector of the respective product analogous to the method described above. The communication between the mobile phone 13 and the control unit 11 can take place either directly or through a wireless network, e.g. WLAN installed in the store. Direct communication through Bluetooth or NFC is also possible.

As a mobile phone 13 is usually not equipped with software particularly required for this, a bar code 43 is additionally affixed on the shelf 12, which serves as a link to the appropriate software, such as an application for a mobile phone, for example. By reading in the barcode 43 using the mobile phone 13, the mobile phone 13 is enabled to download the respective software from the internet, for example, and to execute it.

The barcodes 43, 44 may be linear barcodes, but also two-dimensional barcodes such as QR codes, for example. Instead of a barcode 43, a hyperlink in textual form may naturally also be provided in this area. It is furthermore feasible to directly provide for the software at this location by means of Bluetooth or Near Field Communication (NFC).

A product association, which corresponds to the assignment of the respective products to the lamp addresses, can be done manually. This, however, requires great personnel expenditure. Alternatively, the barcode 44 can be scanned on the products 40, 41, and 42 using a barcode reader or a mobile phone or tablets, for example, to select the respective product. After such a product selection, a respective shelf position or lamp address may be entered manually to link (the) lamp address(es) and (the) product association(s).

Alternatively, similar barcodes can be affixed on the shelf positions. The operating method to assign a lamp address to a product would thus require successive scanning of the barcode in the area of the shelf 12 and the barcode 44 of the product 41. Instead of barcodes, RFID tags may also be used.

If several customers want to use the lighting system at the same time, it could be difficult because of the ambiguity of the illuminated product. This can be resolved by assigning different colors or blinking patterns to the lighting for the products selected by the respective users. Alternatively, it is possible that the lighting system 10—as long as one user is using it—ignores further inputs by other users.

A prioritized treatment of customer requests to locate products is also possible. The customers can be prioritized according to the order in which they were served. Alternatively, they can be prioritized according to their past purchasing behavior. Prioritization according to necessity is also possible. Visually impaired customers could thus receive preferential treatment by the system, for example.

The lighting system 10 is furthermore not restricted to use on a single shelf 12. For example, a dedicated control unit 11 can be used for each aisle in a store. A central operating unit on which an aisle to be visited is shown to the customer after his product selection is also possible as an additional feature of the lighting system 10.

As a further embodiment, it is possible, for example, when mobile operating elements such as Smartphones are used, to also spatially assign the customer with regard to the product to be located. For instance, pulsating signals emitted through the lamp units can be recorded by the mobile operating unit and a spatial assignment of the person in the supermarket can be determined with regard to the shelf. Based on that, the customer can be led to the product by visual or acoustic output. Other spatial assignment techniques also exists, such as the use of motion sensors, for example, which capture an exact position of the customer in the supermarket and which then lead the customer to the product or the product group addressed previously.

In a further embodiment of the lighting system 10, the electronic labels 14-21 are arranged in areas of the shelf 12 that can usually be illuminated individually. This means, each lamp unit 24-31 has an electronic label 14-21 assigned to it. The electronic labels 14-21 are preferably not wired to the lighting system 10, but are merely in contact with the lighting system 10 through the light radiated from the lamp units 24-31. This means, information from the lighting system 10 is transferred through Visible Light Communication by the lamp units 24-31 to the electronic labels 14-21. Each electronic label has a light receiver for this purpose. The information is product information and/or price information and/or content information and the like, for example.

Energy supply to the electronic labels 14-21 is possible by means of the lamp units 24-31. In this case, the electronic labels 14-21 usually have one solar cell that supplies them with energy. An additional energy supply in a wired form or in the form of a battery is therefore not necessary. To bridge power outages or while the lighting is shut off at night, the electronic labels may be equipped with a battery.

If a low data transfer rate is acceptable, the solar cell may be used as the light sensor.

This way, price information, best before date information, content information etc. of the products 40, 41, and 42 can be displayed through the electronic labels 14-21 in this manner. As the spatial assignment of the products 40-42 to the areas of the lighting system may already available, the additional information concerning the individual products can thus be displayed on the electronic labels 14-21 without any further operating effort.

In a further advantageous embodiment, the products comprise transponders, e.g. RFID tags. In this case, the lighting system 10, especially the shelf 12 also comprises respective receivers in the individual areas which are assigned to the lamp units 24-31. The assignment of the products to the respective areas on the shelf 12 can thus be performed automatically. A manual linking of the product and the area is no longer necessary in this case. By using the RFID tags, particularly wrongly put away products can be found very easily.

The lighting system per the invention may furthermore be used to simplify the storage on the shelves 12. As the assignment of the products to the individual areas is already available, a user, the service staff, for example, by means of the operating unit 11 or a mobile phone, can have products displayed to him, whose best before date is almost exceeded or has been exceeded. This significantly simplifies the sorting out of respective products. The system can also be suited to simplify the restocking of shelves 12. This way, the operating personnel can select the respective product on the operating unit 11 or the mobile phone 13 and can be shown, at which location replenishment of the respective product must be placed on the shelf 12.

A second example of the lighting system 10 per the invention is shown in FIG. 2, which may also be implemented in connection with the first example shown in FIG. 1. The lighting system 10 comprises an operating device 11, which has a control unit 51, a stationary operating unit 50, such as a touch screen, and a database 52.

Assignments of lamp units to products or areas are stored in the database 52. Operating processes can be triggered by the stationary operating unit 50. The products arranged on the respective shelf are represented on a display of the stationary operating unit 50. One of the products may be selected by means of the stationary operating unit 50. The respective assignment of the product to the area on the shelf and thus to the lamp address linked to the product assignment is read from the database 52. The control unit 51 again communicates to lamp units 24-28, such as LED modules in this example. Each lamp unit, as described in connection with FIG. 1, has a lamp address assigned to it. As a reaction to the selection of a product, the respective lamp unit or group of lamp units is illuminated. Electronic labels 14-18 are additionally shown in FIG. 2, which are usually arranged in the line of sight of one of the lamp units 24-28.

Assignments of lamp units to products or areas are stored in the database 52. Operating processes can be triggered by the stationary operating unit 50. The products arranged on the respective shelf are represented on a display of the stationary operating unit 50. One of the products may be selected by means of the stationary operating unit 50. The respective assignment of the product to the area on the shelf and thus to the lamp address linked to the product assignment is read from the database 52. The control unit 51 again communicates to lamp units 24-28, such as LED modules in this example. Each lamp unit, as described in connection with FIG. 1, has a lamp address assigned to it. As a reaction to the selection of a product, the respective lamp unit or group of lamp units is illuminated. Electronic labels 14-18 are additionally shown in FIG. 2, which are usually arranged in the line of sight of one of the lamp units 24-28.

The database 52 need not be located inside the operating device 11. A central database, which supplies several shelves and is therefore connected to several operating units may be used. The same applies to the control unit 51.

Instead of or in addition to operation by means of the stationary operating unit 50, the operation may also take place through a mobile operating unit 13, e.g. mobile phone or a tablet. The stationary operating unit 50, and the mobile operating unit 13 are jointly described as a user interface 54 in this case. The user interface 54 need not comprise both options. The user interface can comprise a stationary operating unit 50 and/or a mobile operating unit 13.

Figure 3:
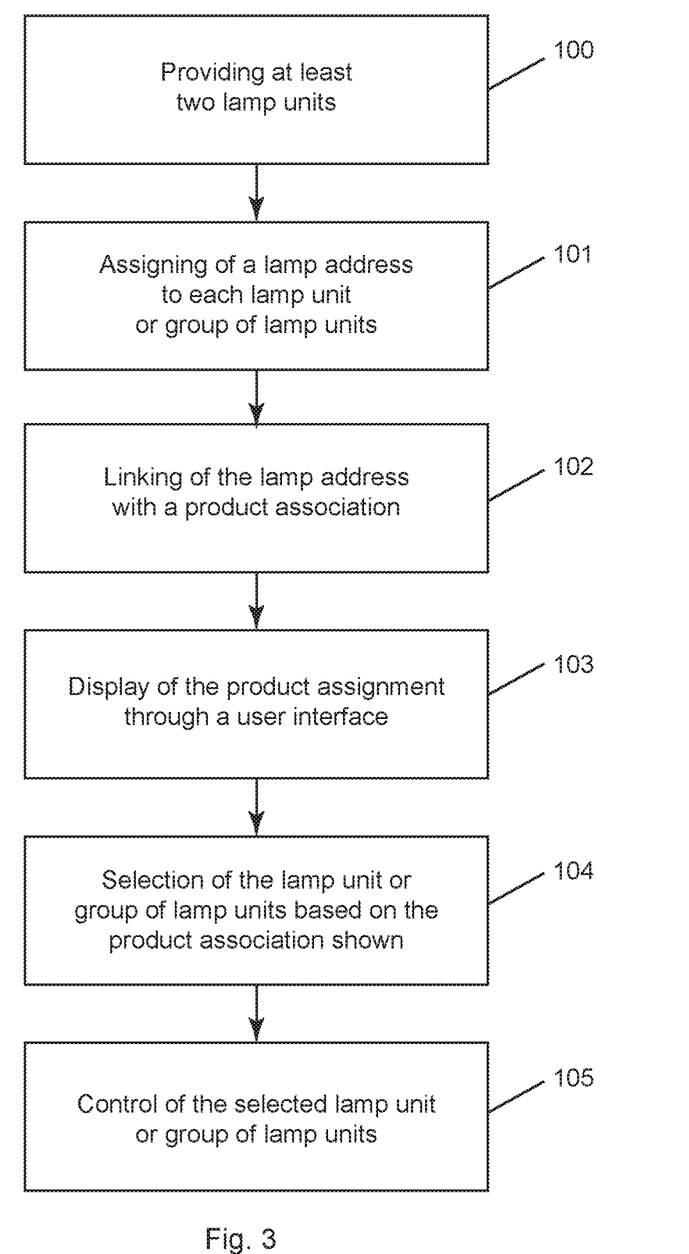
FIG. 3 shows an example of the method per the invention in a flow chart.

An exemplary method per the invention is shown in FIG. 3. At least two lamp units are provided in a first step 100. A lamp address is assigned to each lamp unit in a second step 101. Alternatively or additionally, a lamp address may also be assigned to a group of lamp units. In a third step 102, the lamp addresses are linked to products (product associations). This means, there is now a clear assignment between the lamp addresses and the products. As the lamp addresses are clearly assigned to the respective lamps or group of lamps, and the positions of the lamps or groups of lamps are fixed, the assignment thus corresponds to an assignment of the products to their locations.

In a fourth step 103, the product association is displayed through a user interface. This means, a user can view the products available on a respective shelf. In a fifth step 104, a product is selected by the user and the lamp unit or group of lamp units are thus selected based on the linking of the product assignment and the lamp address. In a sixth step 105, the selected lamp unit or group of lamp units are controlled resulting in optical highlighting of the respective products on the shelf.

With regard to the detailed function, reference is made to the versions of FIG. 1 and FIG. 2.

The invention is not restricted to the portrayed examples. As already indicated, the lighting system may extend across several shelves. Even an entire store may be covered by the lighting system. A dedicated operating device is not necessary for every shelf. Operating devices can rather be arranged in many different locations. Besides LED modules, many different kinds of lamp units may also be used. All previously described features or features shown in the figures are advantageously optionally combinable with each other.

What is claimed is:

1. A lighting system for the locating of products (40, 41, 42) on a shelf, comprising:
    at least two lamp units (24-31), each of which (24-31) or a defined group of which (24-31) is assigned to a different shelf surface,
    a control unit (51) for controlling the lamp units (24-31), to each of which (24-31) or to each defined group of which (24-31) a different lamp address is assigned, whereby each lamp address is linked to a product association that is unambiguously associated with the product (40, 41, 42) located in the assigned space, and
    a user interface (54) for displaying the product association and for selecting, by means of the displayed product association, the lamp unit (24-31) or defined group of lamp units (24-31) to be controlled; and
    wherein the control unit (51) transmits information through modulated light signals from the at least one lamp unit (24-31) or defined group of lamp units (24-31).

2. The lighting system (10) according to claim 1, wherein the user interface (54) comprises at least a stationary operating unit (5) or a mobile operating unit (13).

3. The lighting system (10) according to claim 1, wherein the control unit (51) controls the lamp unit (24-31) or defined group of lamp units (24-31) upon the selection of a product through the user interface (54) according to the selected product assignment and lamp address in order to illuminate with a controlled intensity, blinking pattern, color, change in intensity, or color change for a predetermined period of time.

4. The lighting system (10) according to claim 1, wherein the user interface (54) is adapted to process a selection of a first product (40, 41, 42) by a first user and a selection of a second product (40, 41, 42) by a second user, and the control unit (51) controls the lamp unit (24-31) or defined group of lamp units (24-31) assigned to the first product (40, 41, 42) in accordance with the respective product assignment and lamp address such that the respective assigned space illuminates with a first intensity, a first blinking pattern, in a first color, with a first change in intensity, or with a first color change for a first predetermined period of time, and
    controls the lamp unit (24-31) or defined group of lamp units (24-31) assigned to the second product (40, 41, 42) in accordance with the respective product assignment and lamp address such that the respective assigned space illuminates with a second intensity, a second blinking pattern, in a second color, with a second change in intensity, or with a second color change for a second predetermined period of time, and further wherein the first color and the second color are different,
the first intensity and the second intensity are different,
the first blinking pattern and the second blinking pattern are different,
the first change in intensity and the second change in intensity are different, and
the first color change and the second color change are different.

5. The lighting system (10) according to claim 4, further comprising:
at least one electronic label (14-21), which is affixed in a line of sight to at least one lamp unit (24-31) or defined group of lamp units (24-31),
wherein the electronic label (14-21) adapted to receive modulated light signals from said at least one lamp unit (24-31) or defined group of lamp units (24-31),
and the electronic label (14-21) further adapted to retrieve the information from the modulated light signals of the at least one lamp unit (24-31) or defined group of lamp units (24-31) and adapted to display the information.

6. The lighting system (10) according to claim 5, further comprising:
the electronic label (14-21) comprises a solar cell that provides electrical current to the electronic label (14-21).

7. The lighting system (10) according to claim 1, wherein the user interface (54) is a mobile operating unit (13) adapted to receive the modulated light signal and to retrieve the information contained therein.

8. The lighting system (10) according to claim 7, wherein the mobile operating unit (13) determines from the retrieved information whether the mobile operating unit (13) has reached a product corresponding to a selected product association,
and is adapted to display that the mobile operating unit (13) has reached the selected product, and to transmit to the control unit (51) that the mobile operating unit (13) has reached the selected product, and
further wherein the control unit (51) terminates the controlled illumination of the lamp unit (24-31) or a defined group of lamp units (24-31) when the mobile operating unit (13) reports that it has reached the selected product.

9. A lighting system for the locating of products (40, 41, 42) on a shelf, comprising:
at least two lamp units (24-31), each of which (24-31) or a defined group of which (24-31) is assigned to a different shelf surface,
a control unit (51) for controlling the lamp units (24-31), to each of which (24-31) or to each defined group of which (24-31) a different lamp address is assigned, whereby each lamp address is linked to a product association that is unambiguously associated with the product (40, 41, 42) located in the assigned space, and
a user interface (54) for displaying the product association and for selecting, by means of the displayed product association, the lamp unit (24-31) or defined group of lamp units (24-31) to be controlled; and wherein
the user interface comprises a mobile operating unit (51) configured to determine a navigation route to the selected product, and to display the navigation route to the selected product.

10. The lighting system (10) according to claim 1, further comprising:
at least one sensor designed to determine whether a user has reached a space for a product corresponding to a selected product association and to report this to the control unit (51),
wherein the control unit (51) is adapted to terminate controlled illumination of the lamp unit (24-31) or a defined group of lamp units (240-31), when the sensor reports that the user has reached the space.

11. The lighting system (10) according to claim 1, further comprising:
a bar code scanner for reading a bar code affixed on the product or a barcode affixed on the shelf.

12. A method of assisting in the location of products using a shelf lighting system (10) comprising the steps of:
providing (100) at least two lamp units, each of which (24-31) or a defined group of which (24-31) being assigned to and illuminating a different space on a shelf,
assigning (101) a lamp address to each lamp unit (24-31) or defined group of lamp units (24-31) in a control unit (51) for controlling the lamp units (24-31),
linking (102) the respective lamp addresses with a product association that is unambiguously associated with a product located in the assigned space,
displaying (103) the product association through a user interface (54),
selecting (104) a lamp unit (24-31) or defined group of lamp units (24-31) through the displayed product association, and
controlling illumination (105) of the selected lamp unit (24-31) or defined group of lamp units (24-31) with the control unit (51),
providing a sensor to determine whether a user has reached a space for a product of a selected product association,
and transmitting information from the sensor to the control unit (51), and using the control unit (51) to terminate controlled illumination of the lamp unit (24-31) or defined group of lamp units (24-31) when the sensor reports that the user has reached the space.

13. A method according to claim 12, wherein by means of the stationary operating unit (50) and/or the mobile operating unit (13), the lamp unit (24-31) or defined group of lamp units (24-31) to be controlled is selected by means of the displayed product association.

14. A method according to claim 12, wherein during the selection of a product (40, 41, 42) through the user interface (54), the lamp unit (24-31) or group of lamp units (24-31) assigned in accordance with the product assignment and lamp address is controlled to illuminate with a controlled intensity, blinking pattern, color, change in intensity, or controlled color change for a predetermined period of time.

15. A method according to claim 12, wherein selection of a first product (40, 41, 42) is performed by a first user and selection of a second product (40, 41, 42) is performed by a second user, whereby a first lamp unit (24-31) or group of lamp units (24-31) assigned to the first product in accordance with the respective product assignment and lamp address is controlled such that the respective assigned space illuminates with a first intensity, a first blinking pattern, in a first color, with a first change in intensity, or with a first color change for a first predetermined period of time, and a second lamp unit (24-31) or group of lamp units (24-31) assigned to the second product in accordance with the respective product assignment and lamp address is controlled such that the respective assigned space illuminates with a second intensity, a second blinking pattern, in a second color, with a second change in intensity, or with a second color change for a second predetermined period of time, wherein the first color and the second color are different, the first blinking pattern and the second blinking pattern are different, the first change in intensity and the second change in intensity are different, and the first color change and the second color change are different, take place successively.

16. A method according to claim 12, further comprising the step of:
transmitting information from the at least one lamp unit (24-31) or defined group of lamp units (24-31) by means of modulated light signals.

17. A method according to claim 16, wherein modulated light signals transmitted from the at least one lamp unit (24-31) or defined group of lamp units (24-31) are received by an electronic label (14-21) affixed to the shelf in a line of vision to at least one lamp unit (24-31) or a defined group of lamp units (24-31), and the electronic label (14-21) retrieves the information transmitted by the modulated light signals of the at least one lamp unit (24-31) or group of lamp units (24-31), and displays the information.

18. A method according to claim 17, further comprising the step of:
having the electronic label (14-21) receive radiated light from a solar cell that provides electrical current to the electronic label (14-21).

19. A method according to claim 16, wherein the user interface (54) is a mobile operating unit (13) that is adapted to receive the modulated light signals and retrieve the information contained therein.

20. A method according to claim 19, wherein the mobile operating unit (13), based on the information, determines whether the mobile operating unit (13) has reached a product of a selected product association, and the mobile operating unit (13) shows that the mobile operating unit (13) has reached the selected product and that the control unit (51) terminates the controlled illumination of the lamp unit (24-31) or a defined group of lamp units (24-31) when the mobile operating unit (13) reports that it has reached the selected product.

21. A method according to claim 19, wherein the mobile operating unit (51) is configured to determine a navigation route to the selected product, and to display the navigation route to the selected product.

22. A method according to claim 12, further comprising the step of reading a barcode affixed on the product or a barcode affixed on the shelf.

23. A lighting system (10) according to claim 4, wherein the first and second predetermined periods of time overlap.

24. A lighting system (10) according to claim 4, wherein the first and second predetermined periods of time take place successively.

25. The lighting system (10) according to claim 1, further comprising an RFID scanner for reading an RFID transponder affixed on the product or an RFID transponder affixed on the shelf.

26. A method according to claim 15, wherein the first and second predetermined periods of time overlap.

27. A method according to claim 15, wherein the first and second predetermined periods of time take place successively.

28. A method according to claim 12 further comprising the step of reading an RFID transponder affixed on the product or an RFID transponder affixed on the shelf.

* * * * *